(12) United States Patent
Gundert

(10) Patent No.: US 7,649,061 B2
(45) Date of Patent: Jan. 19, 2010

(54) PROCESS FOR PREPARING A POLY-1-OLEFIN IN THE PRESENCE OF A ZIEGLER CATALYST

(75) Inventor: Friedhelm Gundert, Liederbach (DE)

(73) Assignee: Basell Polyolefine GmbH, Wesseling (DE)

( * ) Notice: Subject to any disclaimer, the term of this patent is extended or adjusted under 35 U.S.C. 154(b) by 409 days.

(21) Appl. No.: 11/658,808

(22) PCT Filed: Jul. 27, 2005

(86) PCT No.: PCT/EP2005/008127

§ 371 (c)(1),
(2), (4) Date: Jan. 29, 2007

(87) PCT Pub. No.: WO2006/010599

PCT Pub. Date: Feb. 2, 2006

(65) Prior Publication Data

US 2009/0005522 A1     Jan. 1, 2009

Related U.S. Application Data

(60) Provisional application No. 60/602,540, filed on Aug. 18, 2004.

(30) Foreign Application Priority Data

Jul. 29, 2004    (DE)   ................ 10 2004 037 229

(51) Int. Cl.
*C08F 4/42*     (2006.01)

(52) U.S. Cl. .............. 526/124.2; 526/106; 526/107; 526/348; 526/125.1; 526/142

(58) Field of Classification Search ........... 526/106, 526/107, 124.2, 125.1, 142, 348
See application file for complete search history.

(56) References Cited

U.S. PATENT DOCUMENTS 3,644,318 A    2/1972   Diedrich et al.
4,613,581 A    9/1986   Maruyama et al.
5,648,309 A    7/1997   Böhm
7,008,898 B1 *   3/2006   Alt et al. ............... 502/105

FOREIGN PATENT DOCUMENTS

| EP | 223011 | 5/1987 |
| EP | 319173 | 6/1989 |
| EP | 532551 | 3/1993 |
| WO | 01/38405 | 5/2001 |
| WO | WO 01/38405 * | 5/2001 |
| WO | 03/099882 | 12/2003 |

OTHER PUBLICATIONS

L. Böhm, "Niederdruck-Polyethlen: Einfachere Verfahren durch Verfachere hochaktive Katalysator-Systeme," *Chem.-Ing. Tech*, vol. 56(9), p. 674-684 (1984).

* cited by examiner

*Primary Examiner*—Ling-Siu Choi
(74) *Attorney, Agent, or Firm*—Jarrod N. Raphael

(57) ABSTRACT

The invention relates to a process for preparing a poly-1-olefin by polymerization of a 1-olefin of the formula $R^4CH=CH_2$, where $R^4$ is hydrogen or an alkyl radical having from 1 to 10 carbon atoms, in suspension, in solution or in the gas phase, at a temperature of from 20 to 200° C. and a pressure of from 0.5 to 50 bar, in the presence of a catalyst which comprises the reaction product of a magnesium alkoxide with a transition metal compound (=component a) and an organometallic compound (=component b) and whose component a has been prepared in a manner having the feature that a magnesium alkoxide powder having a mean particle size, expressed as the $d_{50}$, in the range from 100 to 1000 μm is firstly processed by dry milling in a mill under inert conditions to produce magnesium alkoxide powder having a mean particle size, expressed as the $d_{50}$, of less than 15 μm, then suspended in an inert hydrocarbon in which the magnesium alkoxide is insoluble, and is reacted immediately without further pretreatment with a transition metal compound of titanium, zirconium, vanadium or chromium.

29 Claims, No Drawings

PROCESS FOR PREPARING A POLY-1-OLEFIN IN THE PRESENCE OF A ZIEGLER CATALYST

The invention relates to a process for preparing a poly-1-olefin in the presence of a Ziegler catalyst, one of whose components has been prepared from a magnesium alkoxide suspension and a transition metal compound.

Magnesium alkoxides $Mg(OR^1)(OR^2)$ or "complex" magnesium alkoxides can be reacted with compounds of titanium, zirconium, vanadium or chromium to produce solids which together with organometallic compounds of group 1, 2 or 13 of the Periodic Table (the groups are cited as printed, for example, in Handbook of Chemistry and Physics, 76$^{th}$ edition (1995-1996)) give excellent catalysts for olefin polymerization.

A process for the polymerization of α-olefins in the presence of a mixed catalyst whose component a has been prepared by reacting magnesium alkoxides with tetravalent, halogen-containing titanium compounds is known (cf. U.S. Pat. No. 3,644,318). The magnesium alkoxides are used in the commercially available form. The polymers obtainable by this known process have a narrow molar mass distribution.

Also known is a process for preparing a Ziegler catalyst, in which a dissolved magnesium alkoxide is reacted with a halogen-containing Ti or V compound and a transition metal alkoxide (cf. EP-A 319 173). The catalyst particles formed are spherical and have a mean particle size of from 10 to 70 μm.

Finally, the use of a product of the reaction of a tetravalent, halogen-containing titanium compound with a magnesium alkoxide in which at least 40% by weight of the particles have a diameter of less than 63 μm as transition metal component is known (cf. EP-A 223 011). A magnesium alkoxide having this particle size is obtained, inter alia, by milling a commercial product in a ball mill. The magnesium alkoxide is used as a suspension in an inert hydrocarbon.

Furthermore, it has been stated in EP-A 532 551 that Ziegler catalysts having a high to very high activity which are able to control the particle size distribution of the polymer are obtained when the magnesium alkoxide is used as a gel-like dispersion. This gel-like dispersion is obtained by suspending the commercial magnesium alkoxide in an inert hydrocarbon and dispersing this suspension under protective gas (Ar, $N_2$) in a dispersing unit by means of a high-shear mixer (e.g. ®Ultra-Turrax or ®Dispax, IKA-Maschinenbau Janke & Kunkel GmbH) for a period of a number of hours or days with strong cooling.

WO 01/38405 describes a further process for reacting a gel-like dispersion of magnesium alkoxide with a transition metal compound to produce a Ziegler catalyst, in which the magnesium alkoxide is firstly milled dry to a particular mean particle size in a mill under inert conditions and is only then suspended in a suspension medium and converted into the gel-like dispersion by stirring or shearing with a high-speed mixer.

A further method of producing the gel-like dispersion of magnesium alkoxide is described in WO 03/99882, according to which the suspension of magensium alkoxide in a suspension medium is firstly subjected to heat treatment beyond a particular period of time and is then converted into the gel-like dispersion by stirring or shearing with a high-speed mixer.

All known catalyst formulations are not completely satisfactory in that, as in the case of the magnesium alkoxide dispersion, the energy and time required for the preparation is unsatisfactorily high and should be reduced by means of suitable measures. In the case of the disclosed catalysts based on an $Mg(OEt)_2$ suspension, the polyolefin prepared by means of the catalyst has an unsatisfactorily broad particle size distribution with a high proportion of coarse material.

It was therefore an object of the present invention to find a process for preparing polyolefins in the presence of a Ziegler catalyst, one of whose components is the reaction product of a magnesium alkoxide with a transition metal compound, with the suspended magnesium alkoxide no longer requiring any pretreatment prior to the reaction. In this simpler and more economical preparation, the catalyst should nevertheless display a very high polymerization activity over a long time, and the polymer prepared by means of the catalyst should have a particle size distribution which is just as narrow as polymer prepared in the presence of catalysts which are the result of complicated dispersion processes.

This object is achieved by a process for preparing a poly-1-olefin by polymerization of a 1-olefin of the formula $R^4CH=CH_2$, where $R^4$ is hydrogen or an alkyl radical having from 1 to 10 carbon atoms, in suspension, in solution or in the gas phase, at a temperature of from 20 to 200° C. and a pressure of from 0.5 to 50 bar, in the presence of a catalyst which comprises the reaction product of a magnesium alkoxide with a transition metal compound (=component a) and an organometallic compound (=component b) and whose component a has been prepared in a manner having the feature that a magnesium alkoxide powder having a mean particle size, expressed as the $d_{50}$, in the range from 100 to 1000 μm, preferably from 200 to 800 μm, is firstly processed by dry milling in a mill under inert conditions to produce magnesium alkoxide powder having a mean particle size, expressed as the $d_{50}$, of less than 15 μm, then suspended in an inert hydrocarbon in which the magnesium alkoxide is insoluble, and is reacted immediately without further pretreatment with a transition metal compound of titanium, zirconium, vanadium or chromium.

The invention further relates to the catalyst obtainable by this process.

To prepare the component a, a commercially available magnesium alkoxide is used. This magnesium alkoxide can be a "simple" magnesium alkoxide of the formula $Mg(OR^1)(OR^2)$, where $R^1$ and $R^2$ are identical or different and are each an alkyl radical having from 1 to 6 carbon atoms. Examples are $Mg(OC_2H_5)_2$, $Mg(OiC_3H_7)_2$, $Mg(OnC_4H_9)_2$, $Mg(OCH_3)(OC_2H_5)$, $Mg(OC_2H_5)(OnC_3H_7)$. It is also possible to use a "simple" magnesium alkoxide of the formula $Mg(OR)_nX_m$, where X=halogen, $(SO_4)_{1/2}$, OH, $(CO_3)_{1/2}$, $(PO_4)_{1/3}$, Cl, R is defined as for $R^1$ or $R^2$ and n+m=2.

However, a "complex" magnesium alkoxide can also be used. For the purposes of the present invention, a "complex" magnesium alkoxide is a magnesium alkoxide comprising magnesium together with at least one metal of group 1, 2, 13 or 14 of the Periodic Table. Examples of such a complex magnesium alkoxide are:

$[Mg(OiC_3H_7)_4]Li_2$; $[Al_2(OiC_3H_7)_8]Mg$; $[Si(OC_2H_5)_6]Mg$; $[Mg(OC_2H_5)_3]Na$; $[Al_2(OiC_4H_9)_8]Mg$; $[Al_2(O-secC_4H_9)_6(OC_2H_5)_2]Mg$.

The complex magnesium alkoxides (alkoxo salts) are prepared by known methods.

Preference is given to using the simple magnesium alkoxides, in particular $Mg(OC_2H_5)_2$, $Mg(OnC_3H_7)_2$ or $Mg(OiC_3H_7)_2$. The magnesium alkoxide is used in pure form.

Commercial $Mg(OC_2H_5)_2$ generally has the following specification:

| | |
|---|---|
| Mg content | 21-22% by weight |
| MgCO$_3$ | ≦1% by weight |
| C$_2$H$_5$OH content | <0.3% by weight |

The mean particle diameter is in the range from 600 to 700 μm, with at least 90% of the particles having a particle diameter in the range from 200 to 1400 μm.

The commercial magnesium alkoxide having a mean particle diameter of from about 600 to 700 μm is, according to the invention, milled in the dry state in a mill under inert conditions until the milled material has a mean particle diameter, expressed as the d$_{50}$, of less than 15 μm.

For the purposes of the invention, a mill is considered to be under inert conditions when the proportion of gasses from the atmospheric environment in the total space of the milling apparatus which comes into contact with the magnesium alkoxide during milling has been reduced to less than 1% by volume by displacement by inert gases. For the purposes of the present invention, inert gases are, in particular, nitrogen, hydrogen and argon.

Mills which are particularly suitable for the purposes of the present invention are, for example, ball mills, impact mills, opposed jet mills, spiral jet mills or air separation mills of the Ultra Rotor type. A particularly useful mill is an opposed jet mill as is described in the company brochure "Mechanische Verfahrenstechnik, Trocken- and Nassprozesse" No. 017/10 297.2d from Hosakawa Alpine AG, Augsburg/Germany, and can also be procured from this company.

The milled magnesium alkoxide having a mean particle diameter of less than 15 μm is, according to the invention, brought into suspension, i.e. uniformly distributed by stirring, in a vessel under inert conditions.

For the purposes of the invention, a vessel is considered to be under inert conditions when the proportion of gases from the atmospheric environment in the total space of the vessel which comes into contact with the magnesium alkoxide during stirring has been reduced to less than 1% by volume by displacement by inert gases.

Inert hydrocarbons which are suitable for the purposes of the invention are aliphatic or cycloaliphatic hydrocarbons such as butane, pentane, hexane, heptane, isooctane, cyclohexane, methylcyclohexane, and also aromatic hydrocarbons such as toluene, xylene; it is also possible to use hydrogenated diesel oil fractions or petroleum spirit fractions which have carefully been freed of oxygen, sulfur compounds and moisture. The suspension is then immediately reacted in one stage or in a plurality of stages with a Ti compound (TiCl$_4$, Ti(OR)$_4$ etc.), a Zr compound (Zr(OR)$_4$ etc.), a V compound (VCl$_4$, VOCl$_3$ etc.) or a chromium compound (CrO$_2$Cl$_2$ etc.).

For this purpose, the magnesium alkoxide suspension is reacted with the transition metal compound at a temperature in the range from 20 to 100° C., preferably from 60 to 90° C., in the presence of an inert hydrocarbon while stirring at a stirrer speed corresponding to requirements. From 0.05 to 5 mol of transition metal compound, preferably from 0.1 to 3.5 mol, are used per 1 mol of magnesium alkoxide. The reaction time is from 0.5 to 8 hours, preferably from 2 to 6 hours.

A solid which is insoluble in hydrocarbons and comprises magnesium and transition metal, which for the purposes of the invention is referred to as component a, is obtained. The component a forms a suspension with the hydrocarbon (solid/liquid).

The polymerization catalyst to be used according to the invention is prepared by combining the component a and an organometallic compound of a metal of group 1, 2 or 13 of the Periodic Table (component b). The component a can be reacted directly as a suspension with the component b, but it can also firstly be isolated as a solid, stored and resuspended for further use later.

Preference is given to using organoaluminum compounds as component b. Suitable organoaluminum compounds include chlorine-containing organoaluminum compounds such as dialkylaluminum monochlorides of the formula R$^3{}_2$AlCl or alkylaluminum sesquichlorides of the formula R$^3{}_3$Al$_2$Cl$_3$, where R$^3$ is an alkyl radical having from 1 to 16 carbon atoms. Examples which may be mentioned are (C$_2$H$_5$)$_2$AlCl, (iC$_4$H$_9$)$_2$AlCl, (C$_2$H$_5$)$_3$Al$_2$Cl$_3$. It is also possible to use mixtures of these compounds.

Further suitable organoaluminum compounds are chlorine-free organoaluminum compounds such as aluminum trialkyls AlR$^3{}_3$ or dialkylaluminum hydrides of the formula AlR$^3{}_2$H, where R$^3$ is an alkyl radical having from 1 to 16 carbon atoms. Examples are Al(C$_2$H$_5$)$_3$, Al(C$_2$H$_5$)$_2$H, Al(C$_3$H$_7$)$_3$, Al(C$_3$H$_7$)$_2$H, Al(iC$_4$H$_9$)$_3$, Al(iC$_4$H$_9$)$_2$H, Al(C$_8$H$_{17}$)$_3$, Al(C$_{12}$H$_{25}$)$_3$, Al(C$_2$H$_5$)(C$_{12}$H$_{25}$)$_2$, Al(iC$_4$H$_9$)(C$_{12}$H$_{25}$)$_2$.

It is also possible to use mixtures of organometallic compounds of metals of group 1, 2 or 13 of the Periodic Table, in particular mixtures of various organoaluminum compounds. The following mixtures may be mentioned by way of example:

Al(C$_2$H$_5$)$_3$ and Al(iC$_4$H$_9$)$_3$, Al(C$_2$H$_5$)$_2$Cl and Al(C$_8$H$_{17}$)$_3$, Al(C$_2$H$_5$)$_3$ and Al(C$_8$H$_{17}$)$_3$, Al(C$_4$H$_9$)$_2$H and Al(C$_8$H$_{17}$)$_3$, Al(iC$_4$H$_9$)$_3$ and Al(C$_8$H$_{17}$)$_3$, Al(C$_2$H$_5$)$_3$ and Al(C$_{12}$H$_{25}$)$_3$, Al(iC$_4$H$_9$)$_3$ and Al(C$_{12}$H$_{25}$)$_3$, Al(C$_2$H$_5$)$_3$ and Al(C$_{16}$H$_{33}$)$_3$, Al(C$_3$H$_7$)$_3$ and Al(C$_{18}$H$_{37}$)$_2$(iC$_4$H$_9$), Al(C$_2$H$_5$)$_3$ and isoprenylaluminum (=reaction product of isoprene with Al(iC$_4$H$_9$)$_3$ or Al(iC$_4$H$_9$)$_2$H).

Mixing of the component a and the component b can be carried out prior to the polymerization in a stirred vessel at a temperature in the range from −30 to +150° C., preferably from −10 to +120° C. It is also possible to combine the two components directly in the polymerization vessel at a temperature in the range from 20 to 200° C. However, the addition of the component b can also be carried out in two steps, by the component a being preactivated with a first part of the compound b at a temperature in the range from −30 to +150° C. prior to the polymerization reaction and the further addition of a further part of the same component b or another component b being effected in the polymerization reactor at a temperature in the range from 20 to 200° C.

The polymerization catalyst to be used according to the invention is employed for the polymerization of 1-olefins of the formula R$^4$—CH═CH$_2$, where R$^4$ is a hydrogen atom or an alkyl radical having from 1 to 10 carbon atoms, for example ethylene, propylene, 1-butene, 1-hexene, 4-methyl-1-pentene or 1-octene.

Preference is given to polymerizing ethylene either alone or as a mixture of at least 50% by weight of ethylene and not more than 50% by weight of another 1-olefin of the above formula. In particular, ethylene is polymerized either alone or as a mixture of at least 90% by weight of ethylene and not more than 10% by weight of another 1-olefin of the above formula.

The polymerization is carried out in a known manner in solution, in suspension or in the gas phase, continuously or batchwise, in one or more stages, preferably in two or three stages, at a temperature of from 20 to 200° C., preferably from 50 to 150° C. The pressure is from 0.5 to 50 bar. Preference is given to carrying out the polymerization in the industrially particularly interesting pressure range from 1.5 to 30 bar.

Here, the component a or the reaction product of the component a with the component b is used in a concentration, based on transition metal, of from 0.0001 to 1 mmol, preferably from 0.001 to 0.5 mmol, of transition metal per dm$^3$ of dispersion medium. However, higher concentrations are also possible in principle.

The suspension polymerization is carried out in an inert suspension medium customary for the Ziegler low-pressure process, for example in an aliphatic or cycloaliphatic hydrocarbon; examples of such a hydrocarbon are butane, pentane, hexane, heptane, isooctane, cyclohexane, methylcyclohexane. It is also possible to employ petroleum spirit fractions or hydrogenated diesel oil fractions which have carefully been freed of oxygen, sulfur compounds and moisture.

Suspension polymerizations or gas-phase polymerizations can be carried out directly or after prepolymerization of the catalyst, with the prepolymerization advantageously being carried out by the suspension process.

The molar mass of the polymer is regulated in a known manner; preference is given to using an appropriate amount of hydrogen for this purpose.

Owing to the high activity of the catalyst used, the process of the invention gives polymers having a very low transition metal and halogen content and therefore extremely good results in the color stability test and corrosion test.

The process of the invention surprisingly makes it possible to prepare the catalysts in such a way that their particle size distribution and, to a certain extent, also the particle shape of the polymer powder formed and particularly surprisingly also the polymerization activity and the response to hydrogen of the catalyst can be set optimally without prior dispersion of the Mg(OEt)$_2$ being necessary.

An improved particle morphology, especially a surprisingly narrow particle size distribution expressed as the S value in accordance with DIN 66 144, no coarse and fine fractions and high catalyst productivities are obtained according to the invention. The bulk densities are comparable to those of the prior art.

Thus, when the magnesium alkoxide suspensions prepared according to the invention by dry milling and subsequent simple suspension of the milled magnesium alkoxide in an inert hydrocarbon in which the magnesium alkoxide particles are not soluble are used, the morphological properties of the polymer powder can be influenced, which brings with it valuable advantages for an industrial process in that the transport of the polymer powder in the plant is simpler and the powder flow is better. The high catalyst productivity gives lower residual catalyst contents in the product and thus improved quality.

Furthermore, the preparation of the component a requires a lower amount of energy and a significantly shorter time.

The examples described below are intended to give a person skilled in the art a clearer understanding of the invention.

The reported results on the element composition of the catalysts described were obtained by the following analytical methods:

Ti: photometrically via the peroxide complex

Mg, Cl: titrimetrically by conventional methods

The product properties reported for the polymer powders in table 1 have been determined by the following methods:

MFR$_{5/190}$: in accordance with ISO1133

VN (viscosity number): in accordance with DIN EN ISO 1628-3

Bulk density: in accordance with DIN EN ISO 60 d$_{50}$ (mean particle diameter): in accordance with DIN 53477 and DIN 66144 s value: s=ln(d$_{50}$/d$_{16}$) in accordance with DIN 66144

EXAMPLE 1

According to the Invention

Preparation of the catalyst component a using Mg(OC$_2$H$_5$)$_2$ which has been milled in an opposed jet mill of the type 200 AFG from Hosokawa Alpine AG, Augsburg/Germany, at a throughput of about 25 kg/h starting from commercial Mg(OC$_2$H$_5$)$_2$ to a mean particle diameter of 5.3 μm.

22.9 g of the above-described Mg(OC$_2$H$_5$)$_2$ were placed in a 1 dm$^3$ stirred vessel provided with reflux condenser, 2-blade blade stirrer and inert gas blanketing (Ar) and suspended in 500 cm$^3$ of diesel oil having a boiling range of 140-170° C. (hydrogenated petroleum spirit fraction). This Mg(OC$_2$H$_5$)$_2$ suspension was immediately brought to 70° C. at a stirrer speed of 250 rpm and 0.06 mol of TiCl$_4$ in 50 cm$^3$ of diesel oil (hydrogenated petroleum spirit fraction having a boiling range of 140-170° C.) was metered in over a period of 4 hours. After an after-reaction time of 30 minutes at T=70° C., the mixture was heated to 110° C. and 0.14 mol of Al$_2$(C$_2$H$_5$)$_3$Cl$_3$ in 100 cm$^3$ of diesel oil (hydrogenated petroleum spirit fraction having a boiling range of 140-170° C.) was metered in over a period of 2 hours at a stirrer speed of 250 rpm. The temperature was subsequently maintained at 110° C. for a further 2 hours.

This concluded the preparation of the catalyst component a.

The suspension of the solid was cooled to room temperature. The molar ratio was: Mg:Ti:Cl=1:0.3:2.5.

EXAMPLE 2

According to the Invention

In a 1 dm$^3$ stirred vessel provided with reflux condenser, 2-blade blade stirrer and inert gas blanketing (Ar), 500 cm$^3$ of diesel oil having a boiling range of 140-170° C. (hydrogenated petroleum spirit fraction) were heated to 70° C. 22.9 g of the milled Mg(OC$_2$H$_5$)$_2$ prepared as described in example 1 and having a mean particle diameter of 5.0 μm were subsequently suspended therein. Immediately afterward, 0.06 mol of TiCl$_4$ in 50 cm$^3$ of diesel oil (hydrogenated petroleum spirit fraction having a boiling range of 140-170° C.) was metered in at a stirrer speed of 250 rpm over a period of 4 hours. After an after-reaction time of 30 minutes at T=70° C., the mixture was heated to 110° C. and 0.14 mol of Al$_2$(C$_2$H$_5$)$_3$Cl$_3$ in 100 cm$^3$ of diesel oil (hydrogenated petroleum spirit fraction having a boiling range of 140-170° C.) was metered in at a stirrer speed of 250 rpm over a period of 2 hours. The temperature was subsequently maintained at 110° C. for a further 2 hours.

This concluded the preparation of the catalyst component a.

The suspension of the solid was cooled to room temperature. The molar ratio was: Mg:Ti:Cl=1:0.3:2.4.

EXAMPLE 3

According to the Invention 3.3 kg of the milled Mg(OC$_2$H$_5$)$_2$ prepared as described in example 1 and having a mean particle diameter of 5.3 μm were placed in a 130 l reactor equipped with impeller stirrer and baffles and suspended in 49 dm$^3$ of diesel oil having a boiling range of 140-170° C. (hydrogenated petroleum spirit fraction). This Mg(OC$_2$H$_5$)$_2$ suspension was immediately brought to 70° C. at a stirrer speed of 100 rpm and 8.7 mol of TiCl$_4$ in 4 dm$^3$ of diesel oil (hydrogenated petroleum spirit fraction having a boiling range of 140-170° C.) were metered in over a period of 4 hours. After an after-reaction time of 30 minutes at T=70° C., the mixture was heated to 110° C. and 41.8 dm$^3$ of a 15% strength by weight solution of Al$_2$(C$_2$H$_5$)$_3$Cl$_3$ in diesel oil having a boiling range of 100 to 120° C. (hydrogenated petroleum spirit fraction) (corresponding to 20.2 mol) were metered in over a period of 2 hours at a stirrer speed of 250 rpm. The temperature was subsequently maintained at 110° C. for a further 2 hours. The mixture was then cooled to room temperature and 52 dm$^3$ of the suspension of the catalyst component a was discharged. After addition of 55 dm$^3$ of diesel oil having a boiling range of 140-170° C. (hydrogenated petroleum spirit fraction), the mixture was heated to T=65° C. and 1.8 dm$^3$ of a 10% strength by weight solution of triethylaluminum in hexane (corresponding to 1 mol) were added. At a stirrer speed of 120 rpm, the reactor was flushed three times with hydrogen and pressurized with 2 bar of hydrogen. A total of 3.7 kg of ethylene were subsequently metered in at a rate of 1 kg/h.

This concluded the preparation of the prepolymerized catalyst component.

The suspension of the solid was cooled to room temperature. The molar ratio was: Mg:Ti:Cl=1:0.3:2.3.

COMPARATIVE EXAMPLE 1

Preparation of the catalyst component a as described under example 1 with the difference that milled Mg(OC$_2$H$_5$)$_2$ having a mean particle diameter of 50 μm was used. The molar ratio of the catalyst component was: Mg:Ti:Cl1:0.3:2.6.

COMPARATIVE EXAMPLE 2

Preparation of the catalyst-component a using a gel-like Mg(OC$_2$H$_5$)$_2$ dispersion which had been obtained by stirring a suspension of milled Mg(OC$_2$H$_5$)$_2$ in an inert hydrocarbon.

A suspension of 22.9 g of the milled Mg(OC$_2$H$_5$)$_2$ prepared as described in example 1 and having a mean particle diameter of 5.6 μm in 0.5 dm$^3$ of diesel oil having a boiling range of 140-170° C. (hydrogenated petroleum spirit fraction) was stirred up in a 1 dm$^3$ stirred vessel provided with reflux condenser, 2-blade blade stirrer and inert gas blanketing (Ar) at T=60° C. for a period of 20 hours at a stirrer speed of 60 rpm (revolutions per minute). The settling time of the resulting gel-like Mg(OC$_2$H$_5$)$_2$ dispersion after switching off the stirrer was more than 30 minutes.

This Mg(OC$_2$H$_5$)$_2$ dispersion was brought to 70° C. at a stirrer speed of 250 rpm and 0.06 mol of TiCl$_4$ in 50 cm$^3$ of diesel oil (hydrogenated petroleum spirit fraction having a boiling range of 140-170° C.) was metered over a period of 4 hours. The mixture was then heated to 110° C. and 0.14 mol of Al$_2$(C$_2$H$_5$)$_3$Cl$_3$ in 100 cm$^3$ of diesel oil (hydrogenated petroleum spirit fraction having a boiling range of 140-170° C.) was metered in over a period of 2 hours at a stirrer speed of 250 rpm. The temperature was subsequently maintained at 110° C. for a further 2 hours.

This concluded the preparation of the catalyst component a.

The suspension of the solid was cooled to room temperature. The molar ratio was: Mg:Ti:Cl1:0.3:2.5.

COMPARATIVE EXAMPLE 3

Preparation of the catalyst component a as described under comparative example 2 with the difference that unmilled commercial Mg(OC$_2$H$_5$)$_2$ having a mean particle diameter of from 600 to 700 μm was used.

The molar ratio of the catalyst component a was: Mg:Ti:Cl=1:0.3:2.7.

EXAMPLE 4

Polymerization experiments using the catalysts from examples 1 to 3 and also the comparative examples.

The polymerization experiments were carried out batchwise in a 200 dm$^3$ reactor. This reactor was equipped with an impeller stirrer and baffles. The temperature in the reactor was measured and automatically kept constant. The polymerization temperature was 85±1° C.

The polymerization reaction was carried out in the following manner:

100 dm$^3$ of diesel oil (hydrogenated petroleum spirit fraction having a boiling range of 140-170° C.) were placed in the N$_2$-blanketed reactor and heated to 85° C. Under a blanket of inert gas (N$_2$), the cocatalyst (Al(C$_2$H$_5$)$_3$) was added in such an amount that a cocatalyst concentration of 0.50 mmol/dm$^3$ was present in the reactor. The catalyst component a was then introduced into the reactor in an amount corresponding to 2.0 mmol of titanium as a suspension diluted with diesel oil.

The reactor was pressurized a number of times to 8 bar with H$_2$ (hydrogen) and depressurized again in order to remove the nitrogen completely from the reactor (the procedure was monitored by measuring the H$_2$ concentration in the gas space of the reactor, which was finally 95% by volume). The polymerization was started by opening the ethylene inlet. Ethylene was introduced in an amount of 8.0 kg/h over the entire polymerization time, with the pressure in the reactor slowly increasing. The hydrogen concentration was continually measured in the gas space of the reactor and the proportion by volume was kept constant by metering in appropriate amounts of hydrogen (% by volume of H$_2$=40).

The polymerization was stopped after 225 minutes (30 kg of ethylene introduced) and the total pressure was read off. The contents of the reactor were drained onto a filter. The polymer which was moist with diesel oil was dried for a number of hours in a stream of nitrogen. The results of the polymerizations are shown in table 1.

It can clearly be seen from the values in the table that a catalyst having an excellent property spectrum can be prepared in an advantageous manner by the process of the invention without a time-consuming dispersion step. The catalyst activity, expressed in final pressure in bar, is high. A low final pressure indicates that a low ethylene partial pressure is established in order to obtain the same amount of polymer using the same amount of catalyst under the same experimental conditions (cf.: L. L. Böhm, Chem. Ing. Techn. 56 (1984) 674, eq. (2)). The high values for MFR$_{5/190}$ indicate a very good response to hydrogen. In particular, a very narrow particle size distribution of the polymer, expressed by the s value in accordance with DIN 66 144, is obtained. This means a reduction in the proportion of fines in the polymer powder, which in industry has the advantages that discharge of troublesome fine dust no longer takes place, that the drying time is shortened and that better transport behavior of the powder leads to a higher intake into the extruder for pelletization. Furthermore, the polymers prepared using the catalyst prepared by the process of the invention have a very low proportion of coarse material (>800 μm). This is advantageous for speck-free homogenization in the extruder.

Comparison with comparative example 1 shows that a particle diameter higher than that used according to the process of the invention produces a catalyst having a significantly lower activity and that the polymer has an unsatisfactory particle size distribution. Comparison with comparative example 2 and comparative example 3 shows that a costly dispersion step of 20 hours does not give an improved catalyst.

TABLE 1

Polymerization experiments in 200 dm³ reactor, 50 mmol of triethylaluminum, 2.0 mmol of Ti (catalyst component a), 100 dm³ of diesel oil, 8.0 kg/h of ethylene, polymerization temperature of 85° C., polymerization time of 225 min, 40% by volume of hydrogen in the gas space

| Catalyst component from | Ex. 1 | Ex. 2 | Ex. 3 | Comp. ex. 1 | Comp. ex. 2 | Comp. ex. 3 |
|---|---|---|---|---|---|---|
| $d_{50}$ of Mg(OEt)$_2$/μm | 5.3 | 5.0 | 5.3 | 50 | 5.6 | 600-700 |
| Dispersion time of Mg(OEt)$_2$/[h] | 0 | 0 | 0 | 0 | 20 | 20 |
| Final pressure/bar | 4.7 | 4.0 | 4.9 | 8.7 | 4.7 | 5.2 |
| Yield of PE/kg | 29.9 | 30.0 | 30.1 | 30.0 | 30.3 | 29.9 |
| MFR$_{5/190}$/g/10 min | 5.5 | 4.3 | 5.2 | 4.8 | 3.3 | 4.8 |
| VN/cm³/g | 178 | 200 | 196 | 219 | 208 | 195 |
| Bulk density/g/L | 378 | 370 | 306 | 332 | 339 | 346 |
| $d_{50}$/μm | 257 | 221 | 251 | 513 | 262 | 355 |
| >800 μm/% | 0.10 | 0.11 | 0.05 | 22.4 | 0.03 | 1.4 |
| s value | 0.209 | 0.249 | 0.229 | 0.468 | 0.256 | 0.292 |

The invention claimed is:

1. A process for preparing a poly-1-olefin by polymerizing a 1-olefin of formula $R^4CH{=}CH_2$, wherein $R^4$ is hydrogen or an alkyl radical comprising from 1 to 10 carbon atoms, in suspension, solution, or gas phase, at a temperature of from 20 to 200° C. and a pressure of from 0.5 to 50 bar, in presence of a catalyst comprising:
   a component (a) comprising a reaction product of a magnesium alkoxide with a transition metal compound; and
   a component (b) comprising an organometallic compound;
the process comprising:
   dry milling in a mill under inert conditions an initial magnesium alkoxide powder comprising a mean particle size, expressed as $d_{50}$, ranging from 100 to 1000 μm to produce a finer magnesium alkoxide powder comprising a mean particle size, expressed as $d_{50}$, of less than 15 μm;
   suspending the finer magnesium alkoxide powder in an inert hydrocarbon, wherein the finer magnesium alkoxide powder is insoluble in the inert hydrocarbon to produce a magnesium alkoxide powder suspension; and
   immediately reacting, without further pretreatment, the magnesium alkoxide powder suspension with a transition metal compound comprising titanium, zirconium, vanadium or chromium to produce component (a).

2. The process according to claim 1, wherein the mean particle size of the initial magnesium alkoxide powder ranges from 200 to 800 μm, expressed as $d_{50}$.

3. The process according to claim 1, wherein the inert hydrocarbon is an aliphatic or cycloaliphatic hydrocarbon, an aromatic hydrocarbon, a hydrogenated diesel oil fraction, or petroleum spirit fraction, wherein the hydrogenated diesel oil fraction and petroleum spirit fraction are essentially free of oxygen, sulfur compounds, and moisture.

4. The process according to claim 1, wherein the inert hydrocarbon is butane, pentane, hexane, heptane, isooctane, cyclohexane, methylcyclohexane, toluene, or xylene.

5. The process according to claim 1, wherein the magnesium alkoxide powder suspension is reacted with the transition metal compound in one or more stages.

6. The process according to claim 1, wherein the transition metal compound is $TiCl_4$, $Ti(OR)_4$, $ZrCl_4$, $Zr(OR)_4$, $VCl_4$, $VOCl_3$, or $CrO_2Cl_2$.

7. The process according to claim 1, wherein from 0.05 to 5 mol of the transition metal compound, per 1 mol of magnesium alkoxide in the magnesium alkoxide powder suspension, are reacted at a temperature ranging from 9 to 100° C. in presence of an inert hydrocarbon while stirring.

8. The process according to claim 7, wherein from 0.1 to 3.5 mol of the transition metal compound, per 1 mole of the magnesium alkoxide in the magnesium alkoxide powder suspension, are reacted.

9. The process according to claim 7, wherein the temperature ranges from 60 to 90° C.

10. The process according to claim 1, wherein the process comprises a reaction time of from 0.5 to 8 hours.

11. The process according to claim 1, wherein the process comprises a reaction time of from 2 to 6 hours.

12. The process according to claim 1, wherein component (b) comprises at least one organoaluminum compound of formula $R^3{}_2AlCl$, or alkylaluminum sesquichloride of formula $R^3{}_3Al_2Cl_3$, wherein $R^3$ is an alkyl radical comprising from 1 to 16 carbon atoms.

13. The process according to claim 12, wherein the organoaluminum compound is a dialkylaluminum monochloride compound.

14. The process according to claim 12, wherein component (b) is selected from $(C_2H_5)_2AlCl$, $(iC_4H_9)_2AlCl$, $(C_2H_5)_3Al_2Cl_3$, or mixtures thereof.

15. The process according to claim 1, wherein reacting component (a) and component (b) is carried out in a stirring vessel at a temperature ranging from −30 to 150° C. prior to polymerizing the 1-olefin.

16. The process according to claim 15, wherein the temperature ranges from −10 to 120° C.

17. The process according to claim 1, wherein component (a) and component (b) are reacted by combining component (a) and component (b) directly in a polymerization vessel at a temperature ranging from 20 to 200° C.

18. The process according to claim 1, wherein component (a) and component (b) are reacted by preactivating component (a) with a first part of component (b) at a temperature ranging from −30 to 150° C. to form a preactivated component (a) prior to carrying out the process, and then adding an additional part of component (b), same or different as the first part of component (b), into a polymerization reactor with the preactivated component (a) at a temperature ranging from 20 to 200° C.

19. The process according to claim 1, wherein the catalyst is prepolymerized.

20. The process according to claim 1, wherein the 1-olefin is ethylene, propylene, 1-butene, 1-hexene, 4-methyl-1-pentene or 1-octene.

21. The process according to claim 1, wherein the 1-olefin is ethylene or a mixture of ethylene and another 1-olefin, wherein the mixture comprises at least 50% by weight of ethylene.

22. The process according to claim 1, wherein the process further comprises regulating the molar mass of the poly-1-olefin with hydrogen.

23. The process according to claim 1, wherein the process is carried out in solution, in suspension, or in gas phase, continuously or batchwise in one or more stages, at a temperature ranging from 20 to 200° C., and a pressure from 0.5 to 50 bar.

24. The process according to claim 23, wherein the temperature ranges from 50 to 150° C.

25. The process according to claim 23, wherein the pressure ranges from 1.5 to 30 bar.

26. The process according to claim 1, wherein component (a) or a reaction product of component (a) with component (b), is in a concentration of from 0.0001 to 1 mmol, based/on a transition metal concentration of the transition metal compound per $dm^3$ of dispersion medium.

27. The process according to claim 1, wherein component (a) or a reaction product of component (a) with component (b), is in a concentration of from 0.001 to 0.5 mmol, based on a transition metal concentration of the transition metal compound per $dm^3$ of dispersion medium.

28. The process according to claim 1, wherein the process is carried out in an inert dispersion medium, wherein the inert dispersion medium is selected from the group consisting of aliphatic or cycloaliphatic hydrocarbons, petroleum spirit fractions, or hydrogenated diesel oil fractions, wherein the petroleum spirit fractions and hydrogenated diesel oil fractions are essentially free of oxygen, sulfur compounds, and moisture.

29. The process according to claim 28, wherein the inert dispersion medium is butane, pentane, hexane, heptane, isooctane, cyclohexane, or methylcyclohexane.

* * * * *